United States Patent Office 3,116,172
Patented Dec. 31, 1963

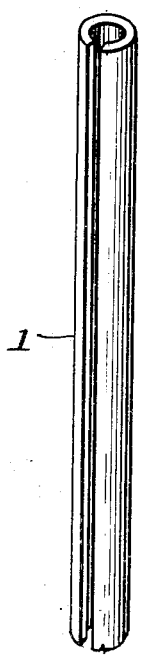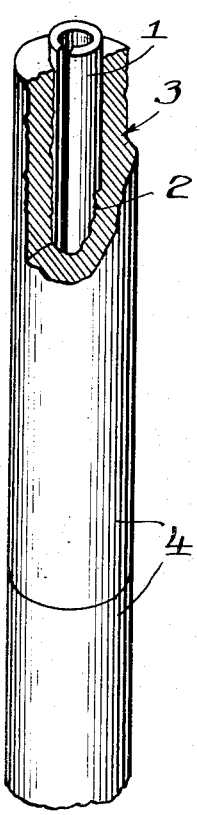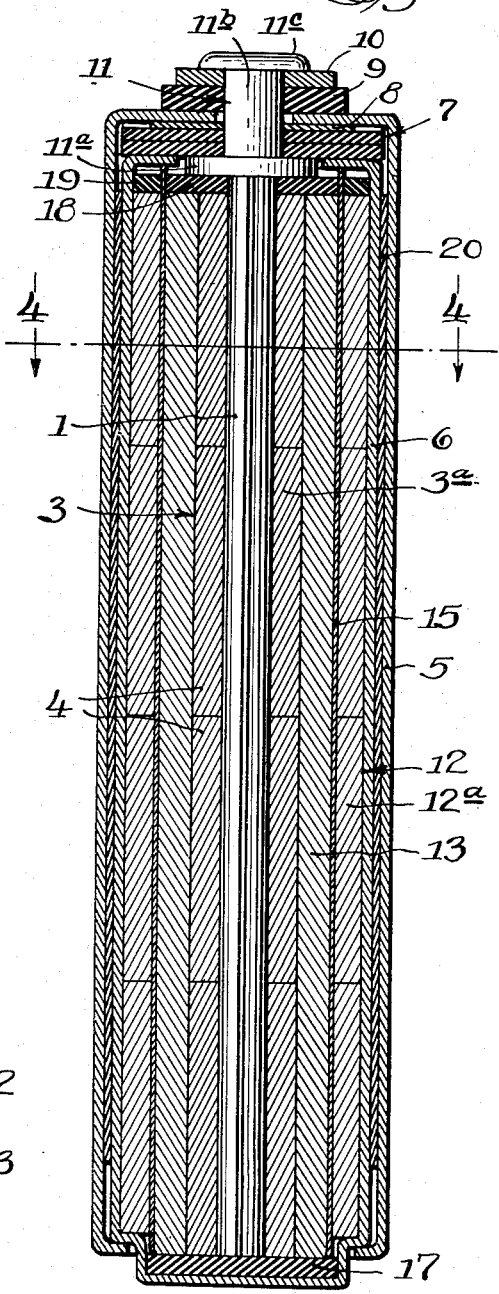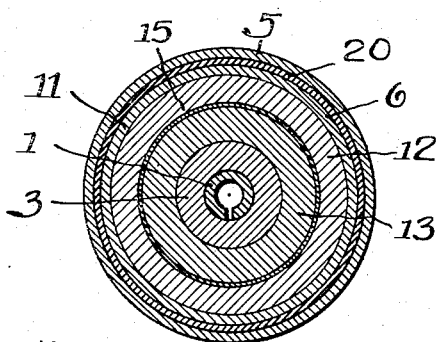

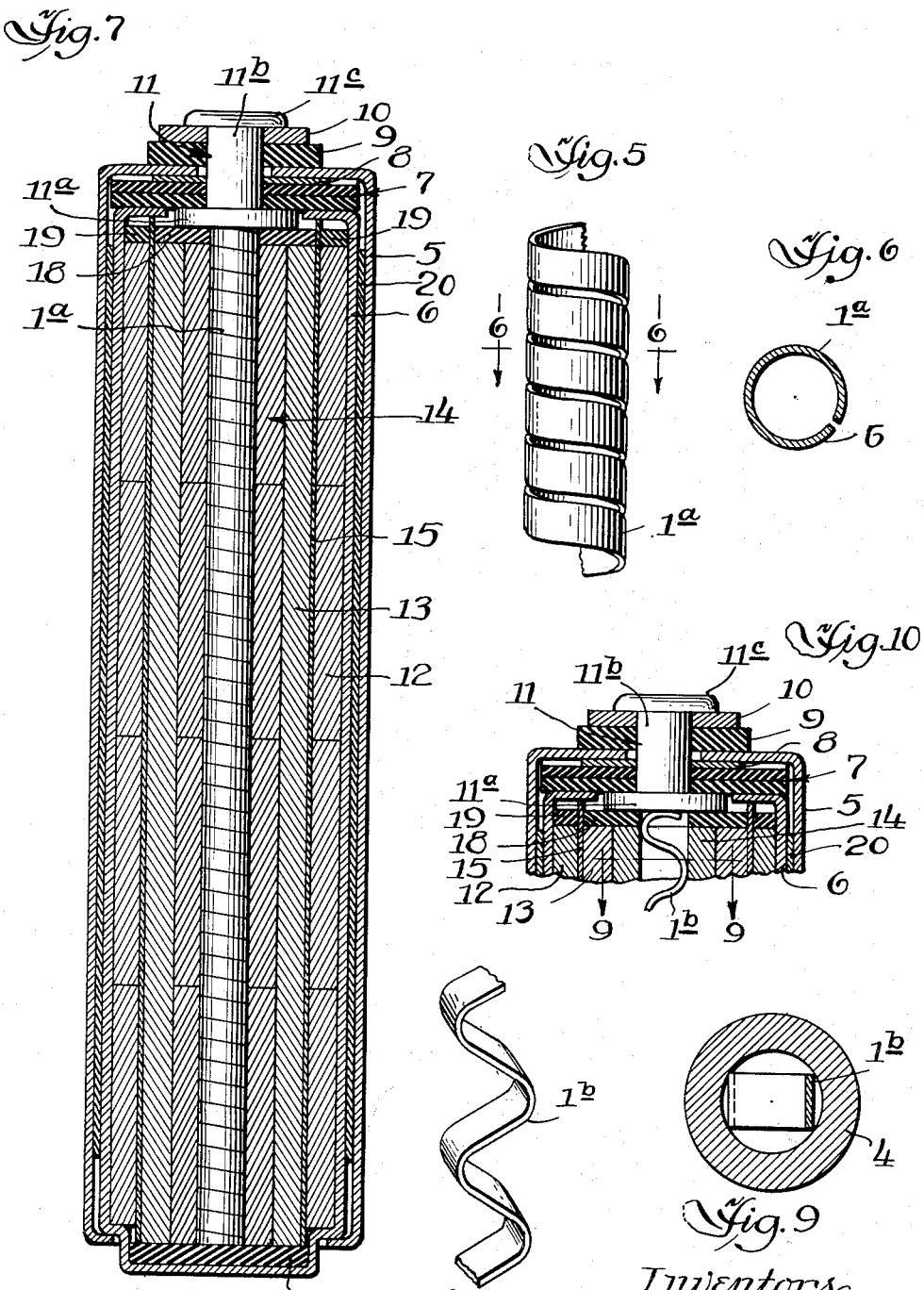

3,116,172
CONTACT FOR USE WITH CYLINDRICAL ANODES
Milton E. Wilke and Robert A. Warren, Freeport, Ill., assignors to Servel, Inc., Evansville, Ill., a corporation of Delaware
Filed Aug. 3, 1959, Ser. No. 831,215
9 Claims. (Cl. 136—107)

This invention relates to a primary cell having a tubular anode, and more particularly refers to a novel means for providing electrical connection between the anode and the negative terminal of a cell of this type.

Cylindrically shaped primary cells having a structure wherein the anode and depolarizer member of each cell are coaxially arranged, and where the anode is centrally located, have been found especially well adapted for use with alkaline electrolytes. Such a structure permits efficient utilization of the active cell elements, and lends itself well to simple and efficient mass production methods of construction. In a coaxially arranged cell, the cathode or depolarizer member is arranged in the form of a tube the outer surface of which is in contact with the wall of the cell enclosure. Such a structure provides excellent electrical connection between the cell enclosure, which serves as the positive terminal, and the cathode. Electrical connection between the anode and the negative terminal, however, is generally provided by positioning the anode so that one end thereof is in physical contact with the negative terminal. Where the end of the anode and the cathode are maintained at the same level, the abnormally large amount of electrochemical action taking place at that level consumes the end of the anode at a more rapid rate than the middle portion, causing the connection between the negative terminal and the anode to become defective after only a short period of operation. Prior attempts to avoid this difficulty have mainly utilized the expediency of maintaining the contact end of the anode at a level considerably higher than that of the corresponding end of the cathode. This arrangement has been effective to some degree, but has required that the anode contain an amount of active material considerably greater than that which is electrochemically equivalent to the depolarizer member, resulting in a material increase in the cost of the cells.

It is an object of the present invention to provide a novel means for making electrical connection between the anode and the negative terminal of a coaxially arranged primary cell.

It is a further object to provide such a means which will allow efficient utilization of the anode metal.

It is still further an object to provide a simple, inexpensive and reliable means for electrically connecting a centrally located tubular anode with the negative terminal of a primary cell having coaxially arranged electrodes.

Other objects and advantages of the present invention will become apparent from the following discussion and from the drawings in which:

FIG. 1 is a perspective view of a contact member according to the present invention in one of its embodiments.

FIG. 2 is a perspective view, partially broken away, of an anode and contact member sub-assembly.

FIG. 3 is a cross section of a primary cell containing the contact member shown in FIG. 1.

FIG. 4 is a cross section of the cell shown in FIG. 3, taken at the line 4—4.

FIG. 5 is a perspective view of another embodiment of the present invention.

FIG. 6 is a cross section of the structure shown in FIG. 5 taken at the line 6—6.

FIG. 7 is a cross section of a cell similar to that shown in FIG. 3 embodying the contact member shown in FIGS. 5 and 6.

FIG. 8 is a perspective view of still another embodiment of the present invention.

FIG. 9 is a cross section taken at the line 9—9 of FIG. 10 of a combination anode and contact member utilizing the structure shown in FIG. 8.

FIG. 10 is a cross section of a fragment of a primary cell containing the contact member structure shown in FIGS. 8 and 9.

According to the present invention, good electrical connection is provided between a primary cell negative terminal and a tubular axially arranged anode by inserting a conductive contact member into the central channel of the anode and maintaining the lateral surface of the contact member in electrical contact with the inside wall of the anode, and maintaining its extremity in electrical contact with the negative terminal.

Referring to the drawings, FIG. 1 illustrates a contact member 1 in the form of a split sleeve composed of an electrically conductive material such as steel, either uncoated or, alternatively, coated with zinc, nickel, or tin. A tube composed of either coated or uncoated brass may also be used.

FIG. 2 illustrates a sub-assembly wherein the contact member 1, as shown in FIG. 1, is positioned in the inner channel 2 of a tubular anode 3 which has been formed by molding amalgamated zinc powder. Either the anode may be constructed as a single unit, or, as shown in the drawing, as a plurality of short tubes 4 which are subsequently linearly arranged in the cell. The internal channel 2 of the anode 3 may have substantially the same diameter as the external diameter of the contact member 1. The outer surface of the contact member will then be in contact engagement with the inner surface of the anode channel. In the preferred form, however, the anode channel has a somewhat smaller diameter than the uncompressed outer diameter of the contact member, so that a spring fit results when the contact member is inserted into the anode, urging the outer wall of the contact member radially against the channel wall. This structure provides a firm contact between the contact member and the anode over a large area, resulting in a good positive electrical connection.

FIGS. 3 and 4 illustrate a cylindrical primary cell having a contact member of the type shown in FIGS. 1 and 2. The cell enclosure is formed by an outer can 5 and an inner can 6. Affixed to the outer can 5 are a laminated sealing disk 7, a venting spider 8, an insulating washer 9, and a metal contact washer 10. The various parts are affixed to the outer can by means of a rivet having a contact head 11a, a body portion 11b, and an upset end 11c.

The functional parts of the cell comprise a cathode depolarizer element 12 made up of a plurality of short tubes 12a, a bibulous electrolyte-retaining separator 13 comprised of webril tubing, and a tubular zinc anode 3 formed as a plurality of short tubes 4. A barrier 15 in the form of a tube and comprised of a material such as parchment paper, or a film of sodium carboxymethyl cellulose, is positioned between the depolarizer member 12 and the bibulous separator 13 in order to prevent the migration of particles of the depolarizer composition into the separator, where a short circuit might be created. The contact member 1 is positioned in the anode channel, and, since its uncompressed outer diameter is greater than the inner diameter of the anode tube, is radially biased against the channel wall, resulting in good electrical connection therewith. A bottom disk 17 of a resilient material such as rubber or neoprene insulates the anode, contact member, and paper separator from the bottom of the inner can, and, additionally, provides an axial biasing force urging the remote end of the contact member against the head 11a of the rivet, to provide a good electrical connection therewith. An inner washer 18 and an outer washer 19, each of a material such as polyethylene, separate the inner cell elements from the rivet head 11a. A paper liner 20 separates the sides of the inner and outer cans, and absorbs any liquid which might escape from the inner can.

FIGS. 5 and 6 illustrate a contact member 1a in the form of a helix formed from either metal strip or metal wire. By proper dimensioning with respect to the central channel of the anode, the contact member may be made to exert a radial biasing force against the channel wall, as well as an axial biasing force against the head 11c of the rivet, assuring good electrical connection between the anode and the rivet. FIG. 7 illustrates a cell containing the contact member structure shown in FIGS. 5 and 6.

FIG. 8 illustrates still another form of the invention. The contact member 1b is shown as a metal strip which has been bent into a sinuous or wave-like form. FIG. 9 shows a structure in which the contact member of FIG. 8 is positioned in the channel of a tubular anode 4. By properly choosing the dimensions of the contact member, it may be constructed to provide a radial contact force against the inner surface of the anode 4, and an axial contact force against the rivet 11a in a manner similar to that described with respect to the contact member illustrated in FIGS. 5 and 6. FIG. 10 shows a cross section of the top portion of a cell similar to that of FIGS. 3 and 7, and having a contact member structure similar to that shown in FIGS. 8 and 9.

The cells may be assembled by first inserting the depolarizer tubes or collars 12 into the inner can 6 where they are held by a press fit. The elastic washer 17 is inserted into the bottom of the can, followed by insertion of the barrier 15, the webril tubing 13, and the premolded zinc powder anode tubes 4. The contact member 1 is then inserted into the hollow central channel 2 of the anode 1. The required amount of electrolyte is added to the separator. If desired, a portion of the electrolyte may be injected into the central channel of the anode. The concentric washers 18 and 19 are then inserted, and the lip of the inner can crimped thereover to retain the washers, and to provide a large annular surface area for making contact with the sealing disk. Assembly of the cell is completed by placing the paper liner 20 over the inner can, sliding the outer can over the inner can, and crimping the outer can lip over the bottom or shoulder of the inner can.

The contact member may be composed of a variety of material and have a variety of forms. The prime requisites are that it be electrically conductive, and that it make good electrical connection with the anode and with the negative terminal. It may be made of a conductive material such as graphite. However, a stronger and more springy material such as steel or brass is preferred. When a metal such as steel is used it may be coated with nickel, tin, or any other protective metal.

The contact member should preferably be in the form of a spring so that it can provide a radial force against the inner wall of the anode to insure good electrical contact. Means must also be provided to force one extremity of the contact member in contact engagement with the negative terminal. This means may comprise an elastic disk at the opposite extremity of the contact member biasing it axially. Alternatively, the contact member may itself be constructed, as in FIGS. 5 and 8, in the form of a spring to provide its own axial biasing force.

The anode is fabricated by molding the anode metal in powder form into the desired shape under pressure. The anode may be molded either in one piece or in the form of short tubes or collars, such as shown in FIGS. 3, 7 and 10, in order to simplify assembly. The separate collars are arranged in the cell axially. The preferred anode metal is zinc although other suitable metals may be used. The zinc powder should preferably be amalgamated, by any suitable method, prior to molding, in order to prevent anode corrosion.

Any bibulous material which is not adversely affected by the particular electrolyte may be used as the electrolyte-retaining separator. The material is preferably wound in the form of a sleeve and placed about the anode. The preferred material is webril, a cellulose paper product.

The electrolyte may be chosen from among any of those suitable for the particular electro-chemical system used. A preferred electrolyte for use with the cells described above has the following composition:

| | Percent |
|---|---|
| KOH | 28 |
| ZnO | 6 |
| $H_2O$ | 66 |

The ZnO dissolves in the electrolyte to form potassium zincate which acts as an inhibiting agent to protect the zinc anode from dissolution in the electrolyte during the period when no current is being drawn from the cell.

The depolarizing agent may be any one of the easily reducible metal oxides commonly used in the art, such as manganese dioxide, mercuric oxide, silver oxide, or copper oxide. Where relatively non-conductive materials are used, as for example, manganese dioxide or mercuric oxide, a minor proportion of a conductive material such as graphite or a carbon black such as acetylene black should be added in order to impart good conductivity to the depolarizing mixture. Where silver oxide is used, it is itself sufficiently conductive so that additional conductive compounds need not be added. A suitable depolarizer composition may be prepared by mixing together about nine parts manganese dioxide and about one part finely divided graphite, or about ten parts mercuric oxide and one part graphite. For particular applications, such as where low current drain is permissible, a carbon black such as acetylene black may be substituted for the graphite. The depolarizer mixture is molded under pressure to form a hollow cylindrical depolarizer member, either in one piece, or as a plurality of tubes or collars as described in conjunction with the drawings above. The diameter of the depolarizer member should be so chosen that a tight press fit will result when it is inserted into the inner can 2, resulting in good electrical contact between the depolarizer member and the can. The carrier member 15 is placed between the separator and the depolarizer in order to prevent depolarizer particles from migrating into the central portion of the cell and causing short circuits. It should be composed of a material which is sufficiently resistant to the electrolyte, which will prevent the passage of depolarizer particles therethrough, but yet, which is sufficiently porous to allow the electrolyte to pass therethrough. Suitable barrier materials are parchment paper, sodium carboxymethyl cellulose, porous polymeric film such as vinyl chloride, and other suitable barrier materials known to the art.

When a contact member having the structure shown in FIG. 1 is used in a cell, the bottom disk 17 thereof should be fabricated from a resilient material such as neoprene to provide an axial resilient force urging the upper end of the contact member against the terminal rivet. However, where structures such as shown in FIG. 5 and FIG. 8 are used, they may be so dimensioned as to provide their own axial biasing force.

The primary function of the present invention is to provide a good electrical connection between the anode and the cell terminal during the entire life of the cell. It accomplishes this even in cells where the top of the anode is level with the top of the cathode. In prior cells it has been necessary to elevate the end of the anode to a point substantially above the level of the cathode, in order to prevent excessive electrolytic action at the end of the anode from interfering with the anode-terminal contact function. The present anode contact member, since it functions over substantially the entire length of the anode, aids in providing good current distribution, and uniform anode consumption. It also allows the anode to be constructed in the form of a series of collars axially arranged by providing good electrical connection between each of the various parts of the anode and the negative terminal. The contact members may be easily constructed and easily incorporated into the cells. Moreover, and particularly in the case of the structures shown in FIGS. 5, 6 and 8, the contact members form a pasasgeway into which electrolyte may be introduced prior to sealing the cell.

Although the present invention has been described in detail only in relation to relatively few specific embodiments, it is to be understood that many variations may be practiced by those skilled in the art without departing from the spirit or scope thereof, within the limits defined by the appended claims.

Invention is claimed as follows:

1. A voltaic cell comprising a cell enclosure having positive and negative terminals, a depolarizer member, cell electrolyte, a substantially rigid tubular metal anode, and an electrically conductive contact member positioned within said anode in positive electrical contact engagement with the inner wall thereof, said contact member comprising a spring biased to provide radial contact force against the inner wall of said anode, one end of said contact member engaging the negative terminal for providing electrical connection between said anode and said negative terminal.

2. A voltaic cell according to claim 1 wherein said contact member comprises a split sleeve having an unflexed outer diameter larger than the inner diameter of said tubular anode, the split portion of said sleeve being in contact engagement with said anode.

3. A voltaic cell according to claim 1 wherein said contact member is comprised of steel.

4. A voltaic cell according to claim 1 wherein said anode is comprised of compressed zinc powder.

5. A voltaic cell according to claim 1 additionally including means for axially biasing said contact member against said negative terminal.

6. A voltaic cell according to claim 1 wherein said spring comprises a coil spring having an unflexed outer diameter larger than the inner diameter of said tubular anode.

7. A voltaic cell according to claim 1 wherein said spring has a sinuous arrangement whose unflexed width is greater than the inner diameter of said tubular anode.

8. In a primary cell comprising a cell enclosure having positive and negative terminals, a depolarizer member, cell electrolyte, and a tubular metal anode, the improvement which comprises means for providing electrical connection between said anode and said negative terminal, said means comprising a split metal sleeve contact spring positioned within said anode and radially biased to provide contact force against the inner wall thereof, one end of said contact spring being in contact engagement with said negative terminal, and a resilient disk positioned at the other end of said contact spring biased to provide an axial force against said spring urging it against said negative terminal.

9. A primary cell according to claim 8 wherein said anode is comprised of compressed zinc powder.

References Cited in the file of this patent

UNITED STATES PATENTS

| 685,176   | Ross        | Oct. 22, 1901 |
| 741,675   | Dickson     | Oct. 20, 1903 |
| 1,196,611 | Tassin      | Aug. 29, 1916 |
| 1,708,889 | Levin       | Apr. 9, 1929 |
| 2,277,687 | Brennan     | Mar. 31, 1942 |
| 2,463,316 | Ruben       | Mar. 1, 1949 |
| 2,687,996 | Butler      | Aug. 31, 1954 |
| 2,708,683 | Eisen       | May 17, 1955 |
| 2,960,558 | Marsal et al. | Nov. 15, 1960 |
| 2,993,947 | Leger       | July 25, 1961 |

FOREIGN PATENTS

| 657,322 | France | Jan. 15, 1929 |